Patented June 13, 1950

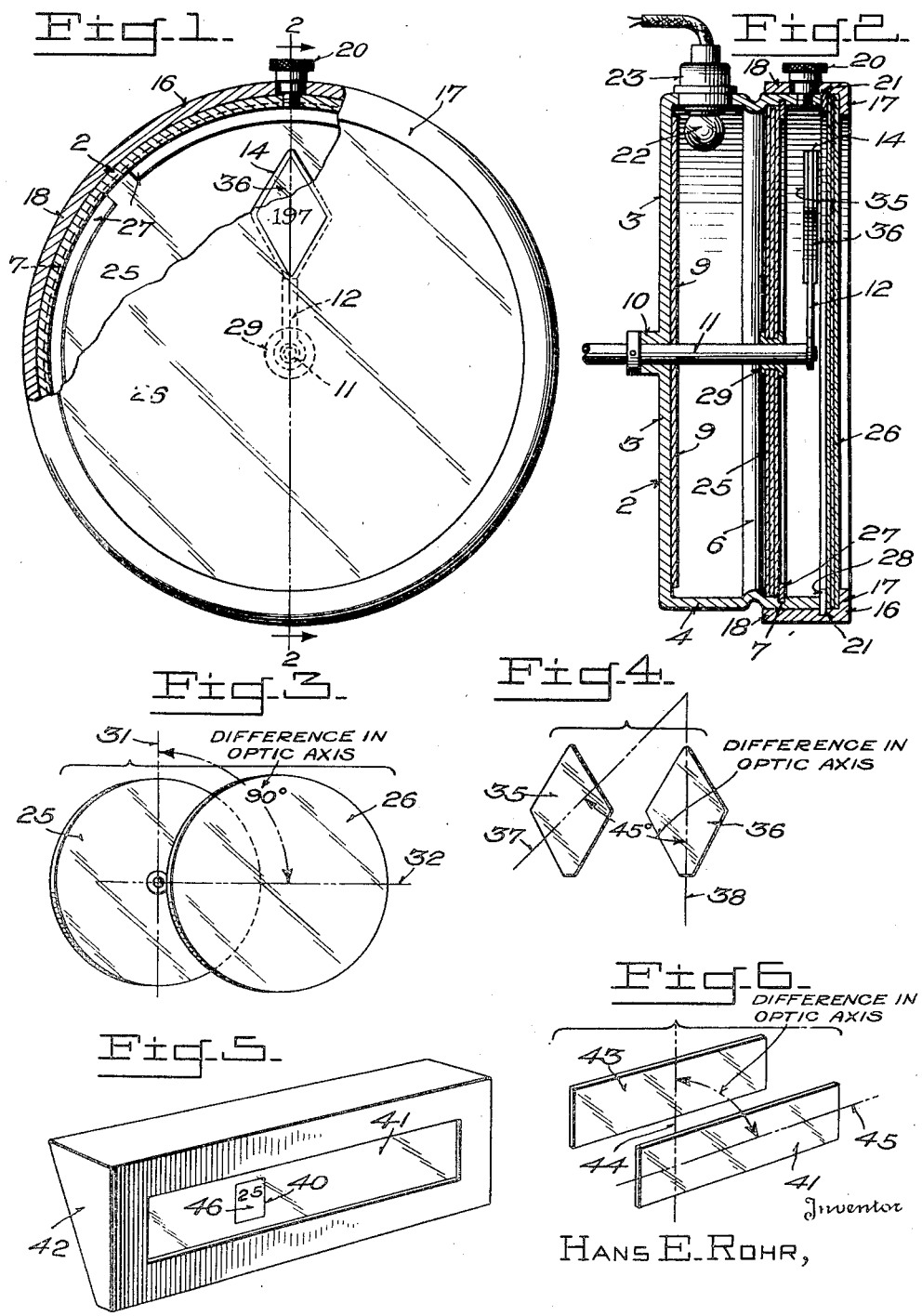

2,511,010

UNITED STATES PATENT OFFICE 2,511,010

LIGHT-POLARIZING BLACK-OUT DEVICE FOR INSTRUMENT DIALS

Hans E. Rohr, New Rochelle, N. Y.

Application December 23, 1944, Serial No. 569,570

9 Claims. (Cl. 88—65)

(Granted under the act of March 3, 1883, as amended April 30, 1928; 370 O. G. 757)

The invention described herein may be manufactured and used by or for the Government for governmental purposes without the payment to me of any royalty thereon.

The present invention relates to a black-out device for illuminated dials of instruments.

The device, or combination of means, of the present invention may be applied to any illuminated dial of an instrument with which a pointer or hand cooperates to indicate something, such as speed, distance, height, volume, pressure, etc. The invention, therefore, finds application in combination with instruments of the type of speedometers, tachometers, odometers, oil and gasoline gages, water gages, altimeters, pressure gages and other instruments having an illuminated dial or scale and a pointer or hand which moves, during operation of the instrument, relatively to the said scale or dial.

An object of the present invention is to substantially extinguish all the light emerging from or reflected by the illuminated dial or scale of the instrument, and from the original light source illuminating the dial or scale, except at the point or place where the pointer or hand of instruments happens to be positioned with respect to the dial or scale.

The device of the present invention is especially useful in connection with illuminated dials of measurement instruments used in warfare, or measuring instruments used on matériel used in warfare, such as automotive vehicles, combat tanks, airplanes, field equipment of various kinds employing illuminated instrument dials or scales. During raids at night by airplanes or under conditions where it is desired that position be not revealed by light originating at the instrument, the present invention enables the dial or face of the instrument to be effectively blacked out, while nevertheless permitting the instrument to indicate visibly to a person, situated at the place where the instrument is installed, the indications, graduations, or quantities carried by the dial or scale of the instrument. Thus, the operator of an automotive vehicle or airplane, or operator of any other thing carrying an illuminated dial and index hand therefor may observe under black-out conditions the fluctuations or indications of the instruments mounted on their panel boards.

Two embodiments of the invention are illustrated in the accompanying drawings.

In these drawings:

Figure 1 is a front elevation, partly in section of one embodiment of the invention;

Figure 2 is a section on the line 2—2 of Figure 1;

Figure 3 is a perspective view of the polarizer and analyzer disks utilized in the embodiments of the invention illustrated in Figures 1 and 2, on a somewhat reduced scale, and displaced somewhat from each other more than is actually the case, in order to more effectively illustrate that the optic axes of the polarizer and analyzer are at ninety degrees to each other when the device is used under black-out conditions.

Figure 4 indicates the relation of the optic axes of the anisotropic transparent material carried by the pointer or hand of the device.

Figure 5 is a perspective view of a housing of the scale or dial of an instrument in which the pointer or hand moves lengthwise across the scale, instead of rotating with respect to the scale.

Figure 6 illustrates in perspective the polarizer and analyzer utilized in the embodiment of the invention illustrated by Figure 5, on a somewhat reduced scale, and displaced somewhat from each other more than is actually the case, and wherein the optic axes of the polarizer and analyzer are at ninety degrees to each other.

Referring specifically to Figures 1 to 4, the housing of the dial of a measuring instrument of one of the types referred to above is designated by means of the numeral 2. This housing consists of a flat rear portion or back 3 and a cylindrical portion 4 in which an inwardly directed circumferential bead 6, and groove 7 have been formed.

On the interior of a housing 2, on the back 3 thereof, is fixed the dial 9 which carries a scale or numbers indicating quantities measured by the instrument, one of such numbers being indicated in Figure 1, by way of illustration, by the number "197."

At the center of the exterior of back 3 of the housing 2 is a bearing 10 for the rocking or rotating shaft 11 of the instrument. The shaft 11 carries a hand or pointer 12 having a light weight frame 14 for the purposes described hereinafter.

The housing 2 is provided with a front cover 16. This cover has a rim 17, that defines an opening therein, and a cylindrical portion 18 that has a sliding fit with the cylindrical portion 4 of the housing 2. A thumbscrew 20 passes loosely through an opening in the cylindrical portion 18 of the cover 16 and engages with a threaded hole in the cylindrical portion 4 of housing 2, in order to hold the cover 16 in fixed relation to the housing 2. Upon unscrewing the thumb screw 20 the cover 16 may be removed from the housing 2. The cover 16, in the cylindrical portion 18 thereof, is provided with a circumferential groove 21.

A source of illumination for the dial 9 is provided. This may consist of an electric light 22 which is carried in a socket 23 on the housing 2 in the embodiment of the invention illustrated.

The device is provided with two transparent panes or plates 25 and 26 which have the property of polarizing light. Both of the polarizing panes are placed in front of the illuminated dial 9, pane 25 being carried by the housing 2 and pane 26 being carried by the cover 16. Polarizing pane 25 is held in the housing 2 between the shoulder formed by the bead 6 and an expansion ring 27 that is expanded in the groove 7. Polarizing pane 26 is held in the cover 16 between the rim 17 and an expansion ring 28 that is expanded in the groove 21 of the cover. The polarizing pane 25 is provided with a central opening in which is fitted a bearing 29 for the shaft 11. The hand or pointer 12 and its frame 14 move in the space between the polarizing panes 25 and 26. This space need only be sufficient to permit free movement of the hand or pointer 12.

The polarizing panes or plates 25 and 26 may be any suitable transparent panes having light polarizing properties similar to a tourmaline plate. Each pane for example, may consist of transparent light polarizing material such as "polaroid." This material generally consists of two panes of transparent material such as glass or plastic between which is located a film or layer which is able to polarize light in a definite plane, the two panes of transparent material and the said film being united together as a lamination of three layers. This material polarizes light by substantially in the same respects and manner as tourmaline.

The optic axis of the polarizing pane 25 in the device illustrated is arranged to be at ninety degrees to the optic axis of the polarizing pane 26, that is, the planes of polarization of the two panes are mutually normal. Preferably the optic axis of one of the polarizing panes 25 and 26 is arranged to be perpendicular to the horizontal, in other words it may be parallel with the section line 2—2 in Figure 1. The optic axes of the polarizing panes 25 and 26 are indicated by the numerals 31 and 32 respectively in Figure 3.

In analogy to the two polarizer elements in a polaroscope, or as is the case when two polarizing plates of tourmaline are used in connection with each other, pane 25 is termed herein a polarizer and pane 26 is termed an analyzer.

On opposite sides of the open frame 14 of the pointer 12, are glued, or otherwise secured, two pieces 35 and 36 of transparent thin light weight anisotropic material in sheet form such as "cellophane." The optic axes 37 and 38 of the two pieces are arranged at an angle of forty-five degrees to each other.

If a single strip of a sheet of anisotropic material is inserted between the crossed polarizing panes, with its optic axis directed towards the center of the two disks 25 and 26 constituting the crossed polarizing panes, and such material is rotated about said center as an axis in a plane parallel to the planes of the two polarizing panes, four positions of the sheet of material, ninety degrees apart, can be found where the material allows no light to pass through the analyzer pane 26. Midway between each of these four positions, the material appears to allow maximum light to pass through analyzer 26. If two sheets of such material are superposed so that their optic axes are at an angle of forty-five degrees to each other, and are placed between crossed polarizer 25 and analyzer 26, whereby polarized light entering one of the sheets emerges therefrom and passes into the other, no position of the so superposed sheets can be found where the analyzer does not transmit light. Therefore, the superposed pieces of transparent material on the frame 14 of pointer 12 will allow indication on the dial 9 to be visible in any position of the frame of the pointer, while substantially no other light is able to pass through analyzer 26.

In effect, the sheet-like transparent anisotropic material produces rotation of the plane polarization of the polarized light produced by polarizer pane 25, that is, the material possesses the property commonly defined in the art as "optically active."

It will be seen, therefore, that as the pointer 12 moves over the illuminated dial 9 when the device is in use, the scale or indications on the dial 9 become visible through frame 14 which carries the two pieces of anisotropic material above described. Thus, the entire front of the device is dark, or substantially no light issues therefrom to an observer situated before it, except at the particular point where the frame 14 of the pointer 12 is located. Thus, effective blacking-out of an illuminated instrument dial is obtained while at the same time enabling the particular scale reading of the instrument at any given time, to be read.

Figures 5 and 6 illustrate an instrument in which the pointer before an illuminated dial carries a frame 40 which moves longitudinally across and behind the analyzer pane 41 carried in a cover or housing 42. The cover 42 is arranged before a polarizer 43, so that the polarizer pane 43 is behind and parallel with the analyzer pane 41, with a space therebetween in which the frame 40 on the pointer moves. The optic axes 44 and 45 of the polarizer and analyzer are at ninety degrees to each other. The frame 40 carries a single piece of transparent sheet anisotropic material parallel with the polarizer and analyzer panes, with the optic axis of the material at an acute angle with the optic axis of the analyzer or polarizer, preferably at an angle of forty-five degrees. The scale or numerals of the illuminated dial behind the frame 40 will then be visible through the material carried by the frame. The number "25" in this frame 40 in Figure 5 represents a number on the dial visible through frame 40.

The cover 16 of the device illustrated in Figures 1 and 2, and the cover 42 in the device illustrated in Figures 5 and 6 may be removed with their analyzer panes and replaced by covers containing plane ordinary glass or other transparent non-polarizing material, when it is desired to convert the devices into a type in which the whole of the illuminated dials is visible to the observer. These so converted devices can, as will be understood, be converted to black-out devices of the type described herein by removing the covers which do not carry analyzer panes, and replacing them by covers 16 and 42 which are provided with analyzer panes.

I claim:

1. An indicator comprising dial means bearing successive spaced indicia defining a path of predetermined configuration, means for illuminating said indicia, first and second spaced polarizer panes, each superposed over said indicia throughout said path, said panes having their planes of polarization substantially mutually normal to thereby normally extinguish light reflected by said indicia, and an indicating element positioned between said panes for guided movement over and along said path, said element comprising a transparent portion covering each indicium in succession as said element is moved, said portion being of an anisotropic material adapted to rotate the plane of polarization of the light passing said first pane to pass through said second pane, whereby said indicia are successively rendered visible as said element transverses said path in indicating movement.

2. An indicator comprising means bearing successive spaced indicia defining a path, first and second spaced parallel polarizer plates superposed over said indicia and extending throughout and substantially parallel to said path, said plates being adapted to have their planes of polarization arranged for extinction of light incident on said indicia, an indicator mounted between said plates, means guiding said indicator over and along said path in indicating relation with said indicia, said indicator comprising double-refracting means effective successively to reveal said indicia as said indicator moves along said path.

3. In an indicating instrument, a casing, a dial mounting in said casing, said dial bearing spaced indicia defining an arcuate scale, means for illuminating said dial, first and second spaced light-polarizing plates carried by said casing in superposed relation to said dial, said plates being substantially coextensive with said scale, and adapted for extinction of light incident on said dial, an indicator shaft journaled in said casing on an axis concentric of said scale, a hand on said shaft, said hand extending between said plates radially of said scale, and pointer means on said hand, said pointer means comprising a double-refracting element adapted to reveal successive portions only of said scale as said pointer is rotated thereover by actuation of said shaft.

4. In an indicating instrument, a dial extending over an area, means for illuminating said dial, a transparent polarizer pane before said dial, a transparent analyzer pane before said polarizer pane, said panes being spaced and mounted in angular relation substantially to extinguish light from said illuminating means incident on said dial, a pointer movable over said dial between said panes, said pointer carrying means for rotating, over a portion only of said area, the plane of polarization of light traversing said polarizer pane, so that the same may traverse said analyzer pane, whereby only that relatively small portion of the dial being traversed by said pointer, is visible at any one time.

5. In an indicating instrument, a dial, means for illuminating said dial, a transparent polarizer pane before said dial, a transparent analyzer pane before said polarizer pane, said panes extending over the entire illuminated area of said dial and arranged substantially to extinguish light proceeding from said dial, a pointer movable in indicating relation over said dial and between said panes, said pointer carrying transparent birefringent means for rotating the plane of polarization of the polarized light proceeding through said polarizer pane, to render visible through said analyzer pane, that portion only of said dial being transversed by said pointer.

6. In an indicating instrument, a dial, a transparent polarizer pane extending over said dial, a transparent analyzer pane extending over said polarizer pane in substantially parallel spaced relation therewith, said dial and panes being in fixed relation, an indicator having an indicating portion between said panes, and movable in indicating relation over and relatively to said dial, said indicating portion comprising two superposed pieces of transparent anisotropic material with their optic axes at 45° to each other, whereby successive portions only of said dial are rendered visible through said panes as said dial and indicator move relatively to each other.

7. A dial comprising a plate member having scale calibrations in an arcuate path on one face thereof, a polarizer positioned in front of said face for polarizing light from said plate, a pointer pivoted with its free end opposite the calibrated portion of the plate and movable in an arcuate path in a plane transverse to the path of the polarized light, a flat optically active member substantially smaller than the calibrated portion of the plate mounted on the free end of the pointer opposite the said calibrated portion and transverse to the path of travel of the polarized light for rotating the plane of vibration of the polarized light for rotating the plane of vibration of the polarized light incident thereon and consisting of two sheets of transparent birefringent material having their crystalline axes at an angle of approximately 45° to each other, an analyzer screen in the path of the polarized light from the polarizer and the said member, the plane of polarization of the analyzer being at right angles to that of said polarizer and means supporting said analyzer and said pointer in spaced relation to each other and to said plate and said polarizer, to said birefringent material rotating the plane of polarization of the light from the polarizer whereby said birefringent member passes the transmitted light in any angular position of the pointer in its arcuate path so that only that part of the calibrated portion of the plate behind the said member is visible through the analyzer.

8. An indicating instrument comprising a dial bearing a plurality of spaced indicia collectively defining a path of predetermined configuration, spaced substantially parallel first and second polarizers each superposed over said path, said polarizers having mutually-normal planes of polarization to thereby extinguish all light incident upon said dial to an observer looking into said plane polarizers, indicating means mounted for movement between said polarizers parallel to said path, means mounting said indicating means for movement between said polarizers for registration over said indicia in succession, said indicating means comprising a pair of superposed birefringent sheets of a size to register with but one indicium at a time, and having their principal planes substantially at 45° to one another whereby each indicium in succession is rendered visible through said polarizers as said indicator moves along said path.

9. In a blackout dial indicator, scale means bearing successive spaced indicia collectively defining a regular path of fixed configuration, a source of artificial light positioned to illuminate said indicia, first and second spaced polarizers superposed over said indicia on the same side thereof and extending along and over said path, said polarizers having their planes of polarization angularly related to extinguish light from said source incident on said indicia to an observer looking at said polarizers, an indicator element, and means mounting said indicator for movement between said plates to register with said indicia in succession as said indicator traverses said path, said indicator element comprising an optically active substance extending over one indicium only at a time and effective to rotate the plane of polarization of light passing through said first polarizer so that said light passes through said second polarizer whereby only the indicium in registration with said indicator element is visible through said polarizers.

HANS E. ROHR.

REFERENCES CITED

The following references are of record in the file of this patent:

UNITED STATES PATENTS

| Number | Name | Date |
|---|---|---|
| 2,123,743 | Pratt | July 12, 1938 |
| 2,165,974 | Land | July 11, 1939 |
| 2,313,923 | Chubb | Mar. 16, 1943 |
| 2,347,582 | Ulffers | Apr. 25, 1944 |
| 2,351,797 | Young | June 20, 1944 |
| 2,393,968 | Burchell et al. | Feb. 5, 1946 |
| 2,393,970 | Burchell et al. | Feb. 5, 1946 |
| 2,404,746 | Rylsky et al. | July 23, 1946 |
| 2,427,896 | Bradley | Sept. 23, 1947 |